(12) United States Patent
Cleary et al.

(10) Patent No.: US 11,543,571 B2
(45) Date of Patent: Jan. 3, 2023

(54) ANGLE- AND POLARIZATION-INSENSITIVE NARROW-BAND OPTICAL FILTERS USING RESONANT CAVITIES

(71) Applicant: US Gov't as represented by Secretary of Air Force, Wright-Patterson AFB, OH (US)

(72) Inventors: Justin W. Cleary, Miamisburg, OH (US); Evan M. Smith, Dayton, OH (US); Ricky D. Gibson, Jr., Hilliard, OH (US); Shivashankar R. Vangala, Mason, OH (US); Joshua Hendrickson, Dayton, OH (US); Ivan Avrutsky, Rochester Hills, MI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 232 days.

(21) Appl. No.: 16/902,672

(22) Filed: Jun. 16, 2020

(65) Prior Publication Data

US 2021/0041612 A1    Feb. 11, 2021

Related U.S. Application Data

(60) Provisional application No. 63/039,486, filed on Jun. 16, 2020, provisional application No. 62/884,210, filed on Aug. 8, 2019.

(51) Int. Cl.
*G02B 5/28* (2006.01)
(52) U.S. Cl.
CPC .................................. *G02B 5/284* (2013.01)

(58) Field of Classification Search
CPC ........ G02B 5/008; G02B 5/201; G02B 5/204; G02B 5/284
See application file for complete search history.

(56) References Cited

U.S. PATENT DOCUMENTS

| 2011/0019189 A1* | 1/2011 | Crouse | ................ H01L 31/054 359/489.08 |
| 2014/0268332 A1* | 9/2014 | Guo | ....................... G02B 5/008 359/885 |

OTHER PUBLICATIONS

Popov et al. (Enhanced transmission due to nonplasmon resonances in one- and two-dimensional gratings, Applied Optics vol. 43, No. 5, pp. 999-1008 (2004)). (Year: 2004).*

(Continued)

*Primary Examiner* — Kimberly N. Kakalec
(74) *Attorney, Agent, or Firm* — AFMCLO/JAZ; Jeffrey V. Bamber

(57) ABSTRACT

A transmission filter apparatus is provided that includes: (i) a substrate to serve as a foundation for the apparatus; (ii) a layer containing resonant dielectric cavities separated by conductive regions. The dimensions and design of the dielectric cavities, thickness of the layer, and substrate, dielectric and conductive materials are chosen to achieve resonant transmission of selected wavelengths. In a particular one or more embodiments, the layer is one dimensional, i.e. you have dielectric cavities along one axis in the plane that are comparatively infinity long in the parallel plane. In a particular one or more embodiments, the layer is two dimensional, i.e. you have dielectric cavities along both axis in the plane. The dimensions in each plane may or may not be equal. In a specific one or more embodiments, the dielectric cavities are terminated on the top and/or bottom by thin metal films with small apertures or tapers.

20 Claims, 10 Drawing Sheets

(56) References Cited

OTHER PUBLICATIONS

G. Perez, A. M. Bernal-Oliva, E. Marquez, J. M. Gonzalez-Leal, C. Morant, I. Genova, J. F. Trigo, and J. M. Sanz, "Optical and structural characterization of single and multilayer germanium/silicon monoxide systems," Thin Solid Films 485(1-2), 274-283 (2005).
C. Sibilia, M. Scalora, M. Bertolotti, M. J. Blomer, and C. M. Bowden, "Electromagnetic properties of periodic and quasi-periodic one-dimensional, metallo-dielecliic band gap structures," J. Opt. A: Pure Appl. Opt. 1(4), 490-494 (1999).
T. W. Ebbesen, H. J. Lezec, H. F. Ghaemi, T. Thio, and P. A. Wolff, "Extraordinary optical transmission through sub-wavelength hole arrays," Nature 391(6668), 667-669 (1998).
J. Zhou and L. Jay Guo, "Achieving angle-insensitive spectrum filter with the slit nanoresonator array structure," J. Nanophotonics 9(1), 093795 (2014).
I. Avrutsky, Y. Zhao, and V. Kochergin, "Surface-pasmon-assisted resonant tunneling of light through a periodically corrugated thin metal film," Opt. Lett. 25(9), 595-597 (2000).
S. R. Vangala, I. Avrutsky, P. Keiffer, N. Nader, D. Walker, J. W. Cleary, and J. R. Hendrickson, "Asymmetric photonic resonances in GaN slab waveguide for mid infrared selective filters," Opt. Express 22(20), 24742-24751 (2014).

\* cited by examiner

ANGLE- AND POLARIZATION-INSENSITIVE NARROW-BAND OPTICAL FILTERS USING RESONANT CAVITIES

CROSS-REFERENCE TO RELATED APPLICATIONS

This application claims the benefit of priority under 35 U.S.C. § 119(e) to U.S. Provisional Application Ser. No. 62/884,210 entitled "Angle- and Polarization-Insensitive Narrow-Band Optical Filters Using Resonant Cavities," filed 8 Aug. 2019, the contents of which are incorporated herein by reference in their entirety.

This application claims the benefit of priority under 35 U.S.C. § 119(e) to U.S. Provisional Application Ser. No. 63/039,486 entitled "Angle- and Polarization-Insensitive Narrow-Band Optical Filters Using Resonant Cavities," filed 16 Jun. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of polarization-insensitive narrow-band spectral filters.

2. Description of the Related Art

Many applications, such as hyper-spectral and multi-spectral imaging, require polarization-insensitive narrow-band spectral filters with transmission spectra that do not change significantly over a wide range of incident angles. Filters that use Fabry-Perot resonances in short cavities with multi-layer dielectric mirrors [(1) Perez, *Thin Solid Films* 485 274-283 (2005)] or transmission resonances in metal-dielectric multilayer Bragg structures [(2) Cibilia, *J. Optics A: Pure and Applied Optics* 1, 490-494 (1999)] have merits. Typical Fabry-Perot resonators show angle dependence although this can be controlled to some degree if the cavity between the mirrors is filled with a high-index dielectric. These structures however become increasingly difficult to implement at longer wavelengths due to increasing optical thicknesses that results in the total thickness of the multi-layer structure becomes too large.

Smaller filtering structures, notable for using only one or few layers, have been achieved with observed sharp spectral resonances. Such structures include grating-based excitation of surface plasmonic waves on a thin metal film with periodic subwavelength holes [(3) Ebessen, *Nature* 391, 667 (1998)], thin periodically corrugated metal films of uniform thickness [(4) Avrutsky, *Optics Letters* 25, 595-597 (2000)], and dielectric film guided modes [(5) Vangala, *Optics Express* 22 24742-24751 (2014)]. These filter structures however are enabled by propagating light waves along the surface that make the filters inherently polarization- and angle-dependent. References [1-5] are hereby incorporated by reference in their entirety.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Present innovation described herein addresses scalability, and angle- and polarization insensitivity. The specific filter to be considered is comprised of one dimensional or two dimensional arrays or resonators that are high index materials surrounded horizontally by conductive regions. The wavelength range of the transmission filter is scalable via physical parameters.

A design of resonant cavities useful as narrow-band, and angle- and polarization-insensitive filters is disclosed. The filter structure is a single layer comprising a dense array of resonators on a suitable substrate. In the simplest case, the resonators are slits in a one dimensional array which provides narrow band filtering and angular insensitivity. Two dimensional arrays add polarization insensitivity. Narrowband characteristics of the filter can be improved by terminating the resonators on the top and bottom by thin metal films with small apertures. Filters of this type are design tunable from infrared through microwave spectral range.

The filtering invention discussed here relies on localized resonances in a system with thin subwavelength-structured layers. It does not involve plasmonic or other guided waves propagating along the surface of the structure, and thus provides transmission characteristics that are practically independent from the direction of the incident wave, i.e. angular insensitivity. Polarization insensitivity is achieved by choosing the structure with proper symmetry. We show characteristics of filters based on the Fabry-Perot resonances in metal films of finite thickness with dielectric-filled voids serving as optical resonators that are practically isolated one from another. Aiming to reduce the thickness of the filter, we use high-index dielectrics for these voids. This also provides additional control over the quality factor of the resonances.

Figure 1A:
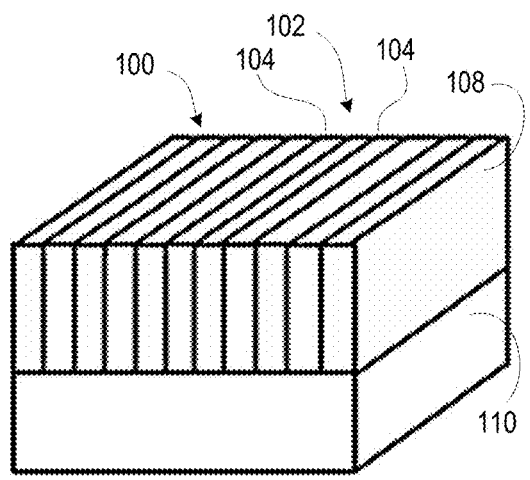
FIG. 1A is an isometric diagram of a filter having a one dimensional array of slit resonators that enable angle-insensitive narrow band transmission, according to one or more embodiments.
Figure 1B:
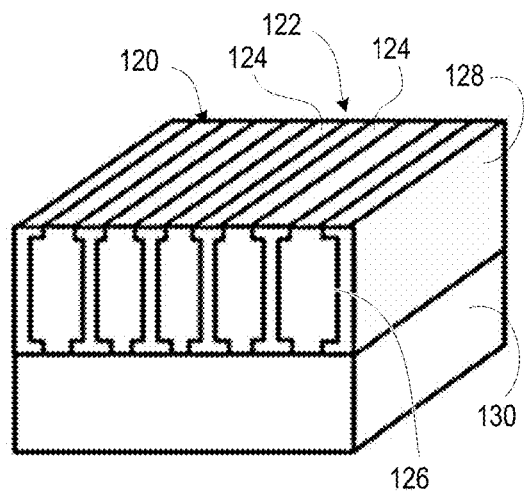
FIG. 1B is an isometric diagram of a filter having a one dimensional array of slit resonators with apertures that enable angle-insensitive narrow band transmission, according to one or more embodiments.
Figure 1C:
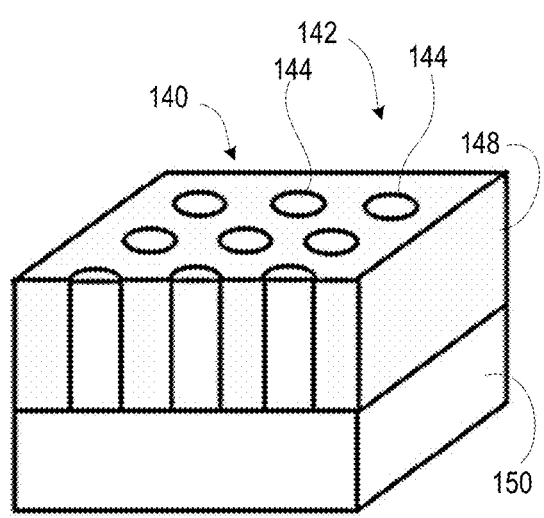
FIG. 1C is an isometric diagram of a filter having a two dimensional array of cylindrical resonators that enable both angle- and polarization insensitive narrow band transmission, according to one or more embodiments.
Figure 1D:
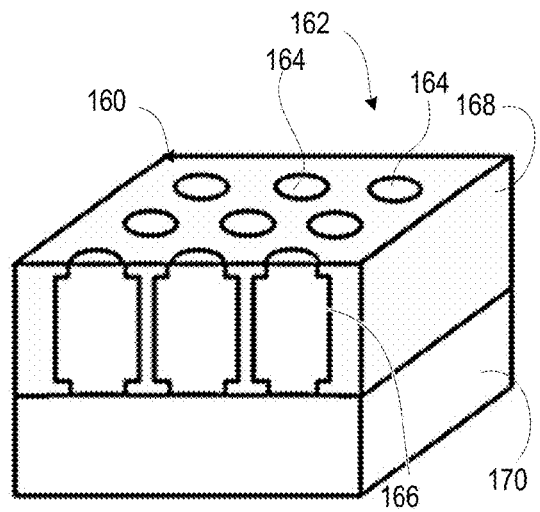
FIG. 1D is an isometric diagram of a filter having a two dimensional array of cylindrical resonators with apertures that enable both angle- and polarization insensitive narrow band transmission, according to one or more embodiments.

FIGS. 1A 1D depict narrow-band filter schematics using few-layers relying on Fabry-Perot resonances. FIG. 1A depicts a filter 100 for a one dimensional array 102 of slit resonators 104 that enable angle-insensitive narrow band transmission. The slit resonators 104 are a cavity filled with a dielectric material surrounded by conductive material 108. The slit resonators 104 and conductive material 108 reside on a substrate 110. FIG. 1B depicts a filter 120 for a one dimensional array 122 of slit resonators 124 with apertures 126 that enable angle-insensitive narrow band transmission. The slit resonators 124 are a cavity filled with a dielectric material surrounded by conductive material 128. The slit resonators 124 and conductive material 128 reside on a substrate 130. FIG. 1C depicts a filter 140 for a two dimensional array 142 of cylindrical resonators 144 that enable both angle- and polarization insensitive narrow band transmission. The cylindrical resonators 144 are a cavity filled with a dielectric material surrounded by conductive material 148. The cylindrical resonators 144 and conductive material 148 reside on a substrate 150. FIG. 1D depicts a filter 160 for a two dimensional array 162 of cylindrical resonators 164 with apertures 166 that enable both angle- and polarization insensitive narrow band transmission. The cylindrical resonators 164 are a cavity filled with a dielectric material surrounded by conductive material 168. The cylindrical resonators 164 and conductive material 168 reside on a substrate 170.

Returning to FIG. 1A, angular dependence of the resonant wavelength is eliminated using the filter 100 first by not relying on modes propagating along the surface of the structure. This is achieved, for instance, in a set of slits in a relatively thick metal layer. Each slit is essentially an isolated resonator, with a light wave propagating up and down the slit and confined in the vertical direction due to reflections at the interfaces with air and substrate. Notably, the resonances exist even if the slits are air-filled. Using high-index filling of the slits helps to reduce the overall size of the resonant structure and gives additional control over the reflection coefficients that define the quality factor of the resonance. Such filter is strongly polarization-dependent due to it being one dimensional.

Returning to FIG. 1B, further elaboration of the structure of the filter 120 may include apertures 124 at the interfaces with air and substrate. The apertures help controlling the reflection coefficients and thus the quality factor of the resonance. In particular, as refractive indices of air and substrate are different, the Fabry-Perot resonators in a set of slits are asymmetric and thus the peak transmission at the resonance is not reaching the maximum value allowed by absorption in the resonators. The apertures of different size help to resolve the issue: somewhat smaller aperture at the interface with substrate is needed to achieve the same reflection coefficient as at the interface with air. The filter 120 is also strongly polarization-dependent.

To eliminate the polarization dependence, the structure of the filter structures can be modified by introducing two dimensional (2D) patterning instead of one dimensional patterning. Returning to FIG. 1C, the filter 140 is two dimensional version of a slit-based filter 100 as in FIG. 1A. There is, however, a significant difference between the two filters 140, 100 associated with the dimensionality of structures guiding light waves in the vertical direction. In the 2D structure, light waves in the dielectric region are the modes of a dielectric-filed hollow pipe. For such modes, there is a cutoff condition, and thus the holes should be large enough to support the modes. Also, the modal index of the hollow pipe mode is lower than the index of gap modes in the slits, leading to larger thickness of the layer in which the filter is implemented. Returning to FIG. 1D, adding apertures to the filter 160 to the two dimensional arrays of filter 140 (FIG. 1C) at the interfaces with air and substrate helps improve the quality of the resonance. Similar to the filter 120 of FIG. 1B, filter 160 includes somewhat smaller apertures at the interface with substrate are needed to symmetrize the reflection coefficients in the Fabry-Perot resonators. Properly designed filters 140, 160 (FIGS. 1C 1D), are both angle- and polarization-independent.

Figure 2A:
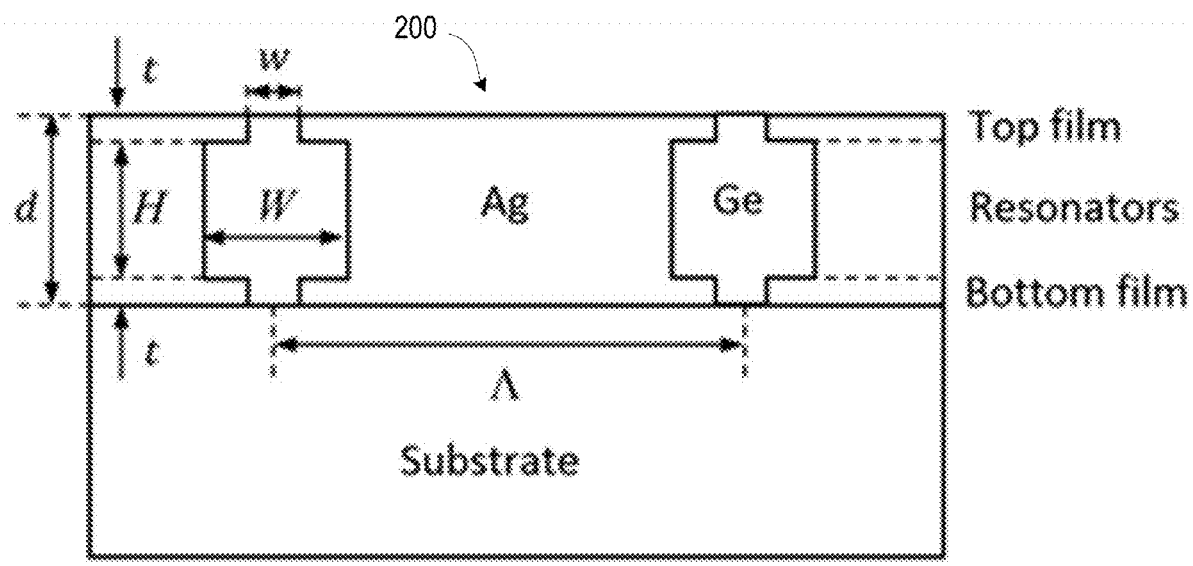
FIG. 2A is a diagram of a one dimensional nano resonator array with apertures, according to one or more embodiments.

FIG. 2A depicts details of a one dimensional nano resonator array 200 with apertures. For more details, we show a one-dimensional array of nano-resonators with subwavelength apertures. The array period is A. The structure in general is treated as a three-layer system, with each layer being a slotted metal film. Top and bottom films of thickness t with slit apertures of width w separate the nano-resonators in the middle film from the substrate and cover. The middle film of thickness H has slit-shaped voids with width W that form the nano-cavities. The resonator dimensions are then H×W. The entire structure is supported by a substrate that must be transparent in the spectral range of interest.

In a particular case, when w=W the structure is a single slotted metal film with total thickness of d=H+2t. In this case, it is appropriate to treat the slits as resonators with dimensions d×W. In case of w<W the resonators with dimensions H×W are terminated by small apertures at the interfaces with cover (typically air) and substrate. We note again that t may not be equal for the top and bottom layers.

As a more specific example, we look at dielectric cavities and apertures that are high-index dielectric Ge (index of refraction n=4.0). In this case the metal is silver and the substrate is dielectric Barium fluoride (BaF$_2$) with refractive index of n$_s$=1.40, close to the value for λ=10 μm wavelength. Barium fluoride is transparent up to wavelengths about 12.5 μm.

Figure 2B:
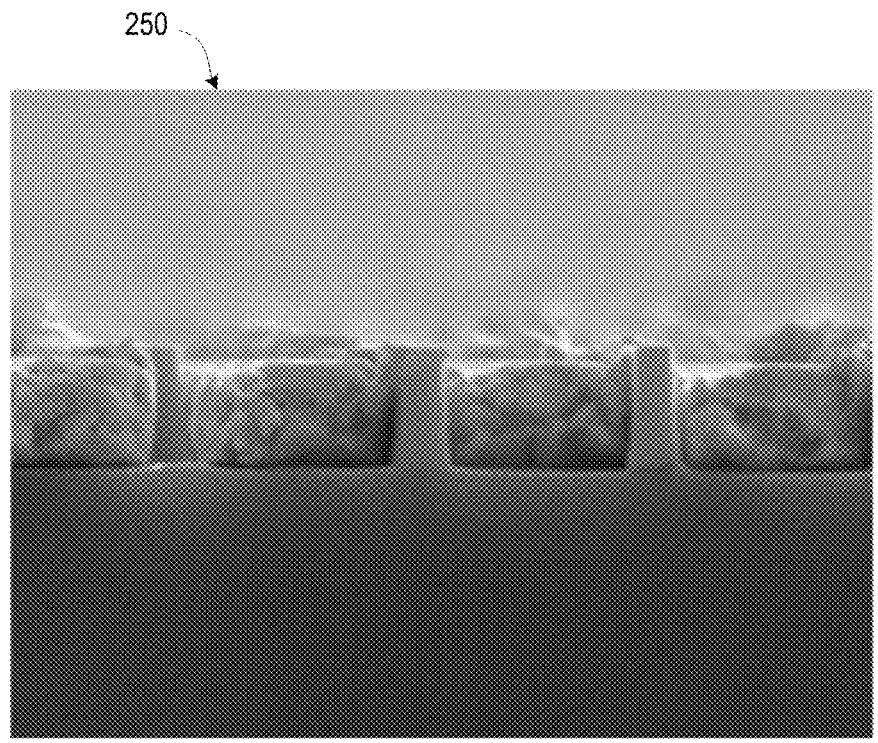
FIG. 2B is a photograph of a scanning electron microscope image of a preliminary one dimensional nano resonator array, according to one or more embodiments.

FIG. 2B depicts a scanning electron microscope image of a preliminary one dimensional nano resonator array 250 as a preliminary fabricated structure using these materials which operates in the long-wavelength infrared. What follows gives an example structure using these materials.

Figure 3A:
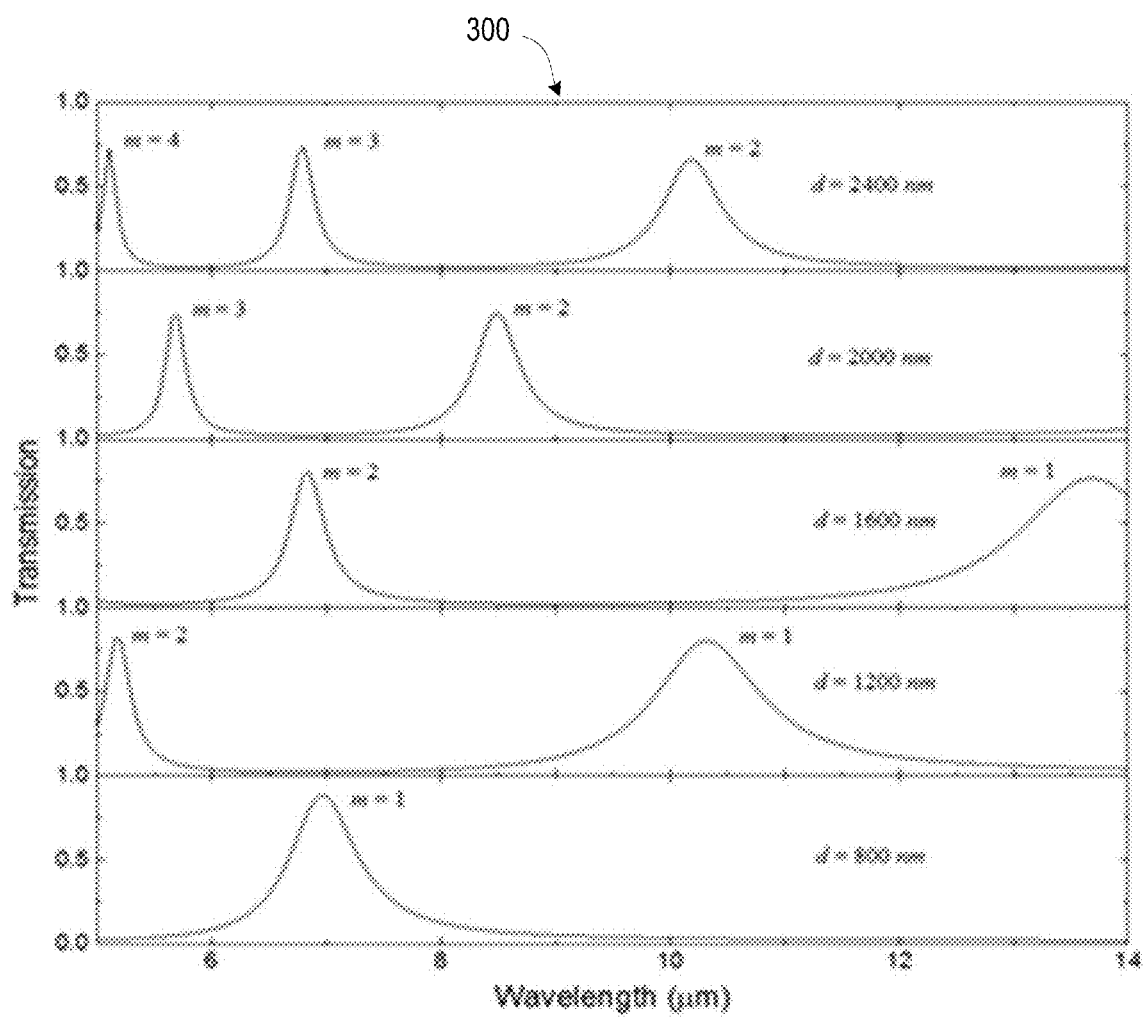
FIG. 3A is a graphical plot of wavelength versus thickness of simulated normal incidence transmission spectrum for a slotted metal film (w=W, t=0) with high-index dielectric in the slits, according to one or more embodiments.
Figure 3B:
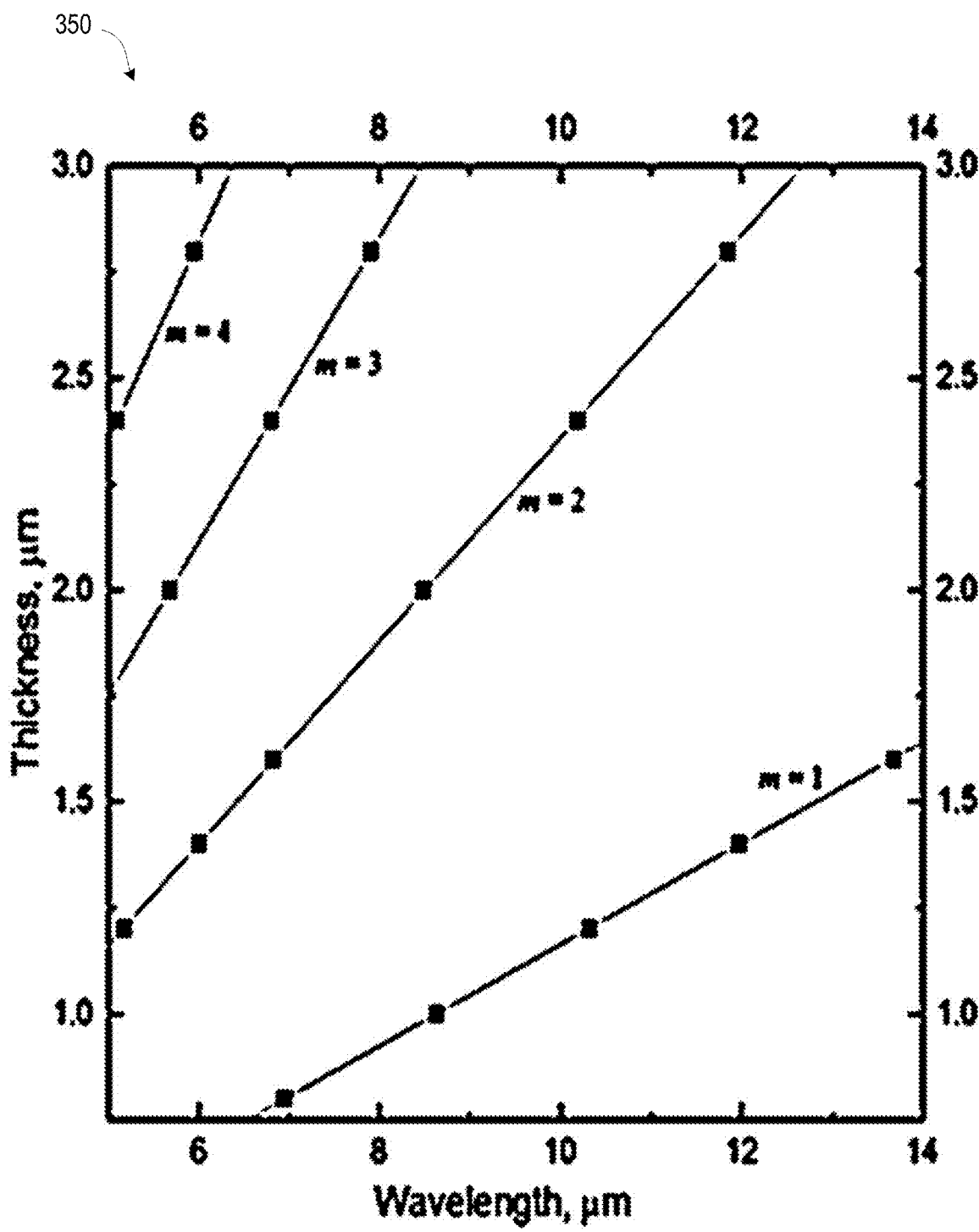
FIG. 3B is a graphical plot of wavelength versus thickness depicting thickness of the film required for placing resonances at a desirable wavelength, according to one or more embodiments.

FIG. 3A is a graphical plot 300 of wavelength versus thickness of simulated normal incidence transmission spectrum for a slotted metal film (w=W, t=0) with high-index dielectric in the slits. The film thickness d is in the range from 0.8 μm-2.4 μm, slit width is W=0.5 μm, and the period is Λ=2 μm. FIG. 3B is a graphical plot 350 of wavelength versus thickness depicting thickness of the film dm(λ) required for placing resonances at a desirable wavelength λ. Symbols show scatter data from simulated normal incidence transmission spectra for a slotted metal film. Red lines show linearly extrapolated values.

To verify the Fabry-Perot nature of the resonances, we show dependence of resonant wavelengths on the film thickness that defines the resonator length. Simulated transmission spectra for some representative values of the film thickness dare shown in FIG. 3A. The peak transmission is slightly reduced for thicker films but remains in the 70%-80% range. Notably, the slits (W=0.5 μm) make only 25% of the period (Λ=2 μm). In a sense, effective transmission per slit is above unity in the 2.8-3.2 range. With resonances in the neighborhood of λ=10 μm, the slit width makes only 5% of the wavelength. The Fabry-Perot resonant wavelengths are scaled approximately proportional to the length of the resonator or the film thickness din this case (FIG. 3B). Other means of wavelength scaling will be discussed below.

Figure 4A:
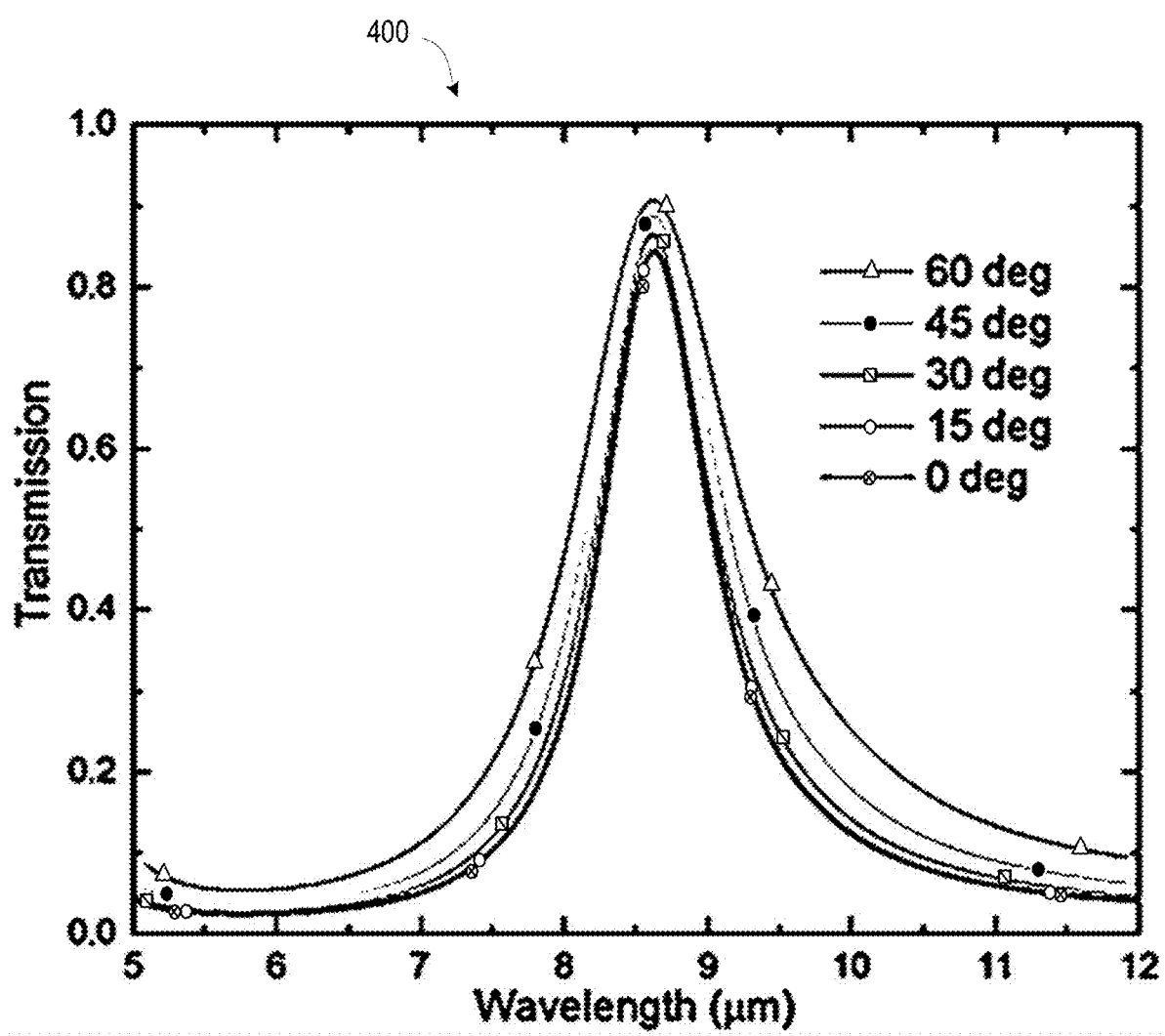
FIG. 4A is a graphical plot of wavelength versus transmission. Simulated transmission demonstrating angle-insensitive filtering by a one-dimensional set of narrow slits, according to one or more embodiments.
Figure 4B:
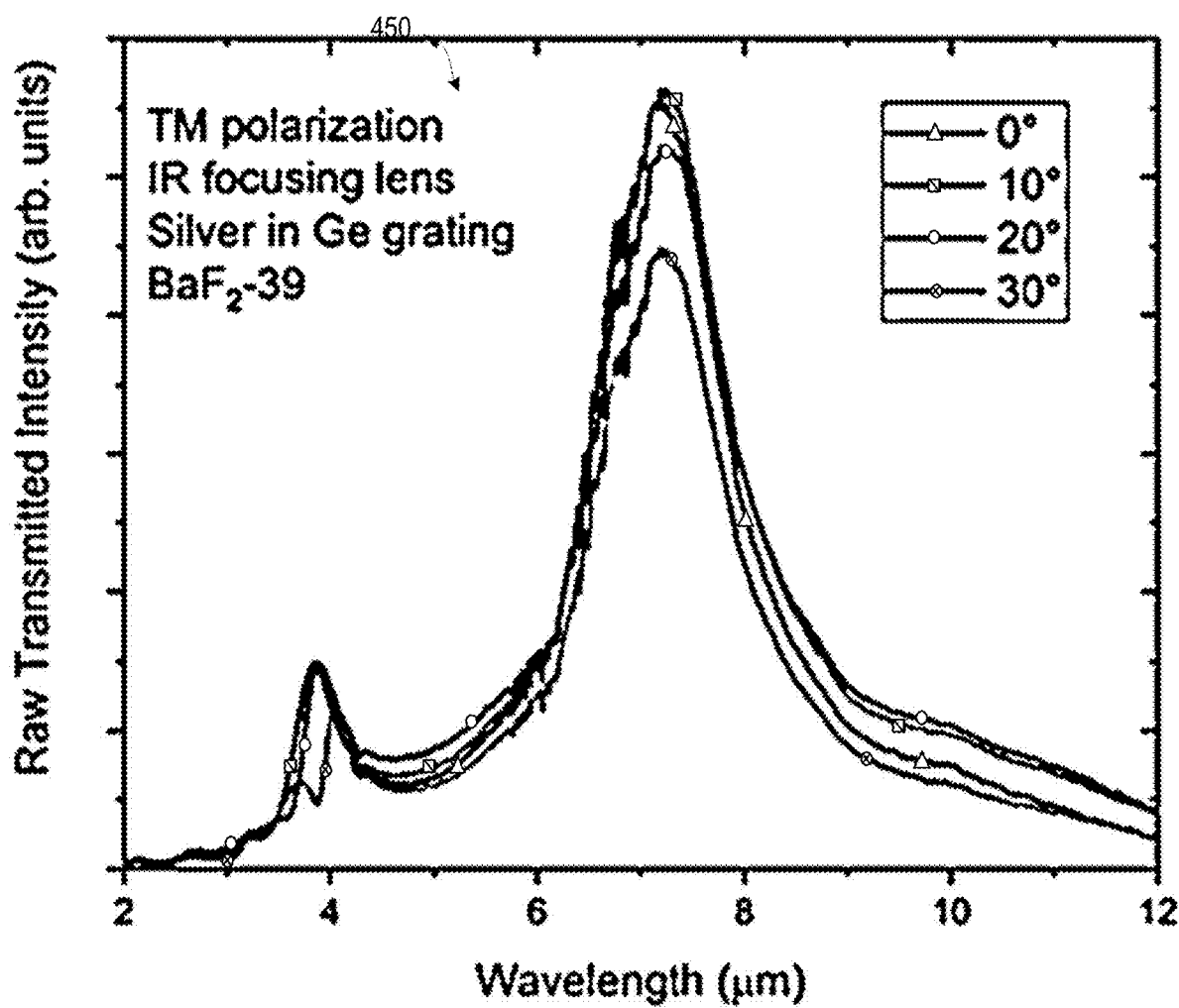
FIG. 4B is a graphical plot of raw transmitted intensity as a function of wavelength depicts preliminary experimental data, according to one or more embodiments.

FIG. 4A is a graphical plot 400 of wavelength+2t versus transmission. Simulated transmission demonstrating angle-insensitive filtering by a one-dimensional set of narrow slits. FIG. 4B is a graphical plot 450 of wavelength versus raw transmission intensity. Preliminary experimental transmission demonstrating filtering that is angular insensitive up to 30°.

Variations of the transmission spectra for the fundamental resonance associated with other than normal incident angles are shown in FIG. 4A. Transmission spectra for angles 0° 15° are practically indistinguishable. At larger incident angles the transmission peak is slightly taller and wider (simulated data), but the resonant wavelength remains the same. FIG. 4B depicts a graphical plot 450 of raw transmitted intensity as a function of wavelength depicts preliminary experimental data. The data confirms similar indistinguishability for similarly small angles although the structures remain to be optimized.

For the same reason that resonant wavelengths in the slits are angle-independent, they also do not change much with the structure period which was confirmed with simulations.

In the structures under consideration, each slit or cavity is a resonator on its own and periodicity is only an indication of how dense the array of slits is. Thus, it primarily affects the magnitude of the transmission peaks but not the resonant wavelengths. Increasing the period results in reducing peak transmission. Structures with shorter periods show strong resonances, although the resonances in neighboring slits begin to couple resulting in wider transmission peaks and slight blue-shifting of the resonant wavelength.

Slit or resonator width also has broadening and slight shifting impacts on the resonant transmission. The resonant wavelengths in smaller slits are shifted to longer wavelengths. The transmission resonant width decreases and suppression of out-of-band transmission becomes increasingly notable. Peak transmissions however decrease with decreasing slit width.

Figure 5A:
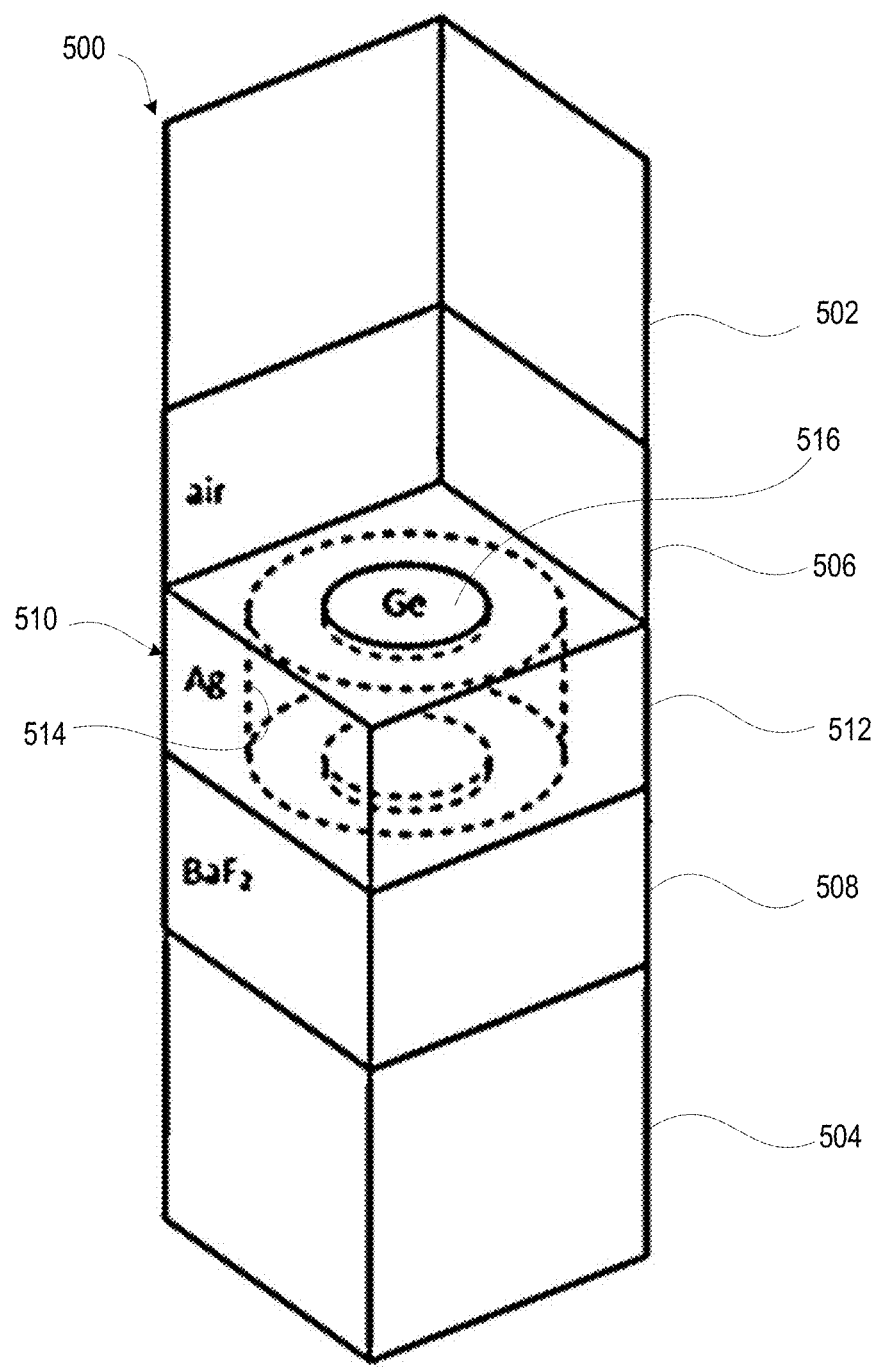
FIG. 5A is a top isometric diagram of a cell structure of a two dimensional nano resonator array with apertures, according to one or more embodiments.

FIG. 5A is a diagram of a cell structure 500 of a two dimensional nano resonator array with apertures. In one or more embodiments, the cell structure 500 includes top and bottom perfectly matching layers 502, 504. Between the matching layers 502, 504 are a top cover 506 (n=1.0 of air) and a bottom substrate layer 508 (n=1.4 of BaF2). Between the cover 506 and the substrate layer 508 is a filter assembly 510 of an outer silver body 512 having a vertically aligned cavity 514 filled with a high-index dielectric 516 such as germanium. The cavity 514 can have a shape of vertical stack of three cylinders with the middle cylinder having a wider diameter.

Figure 5B:
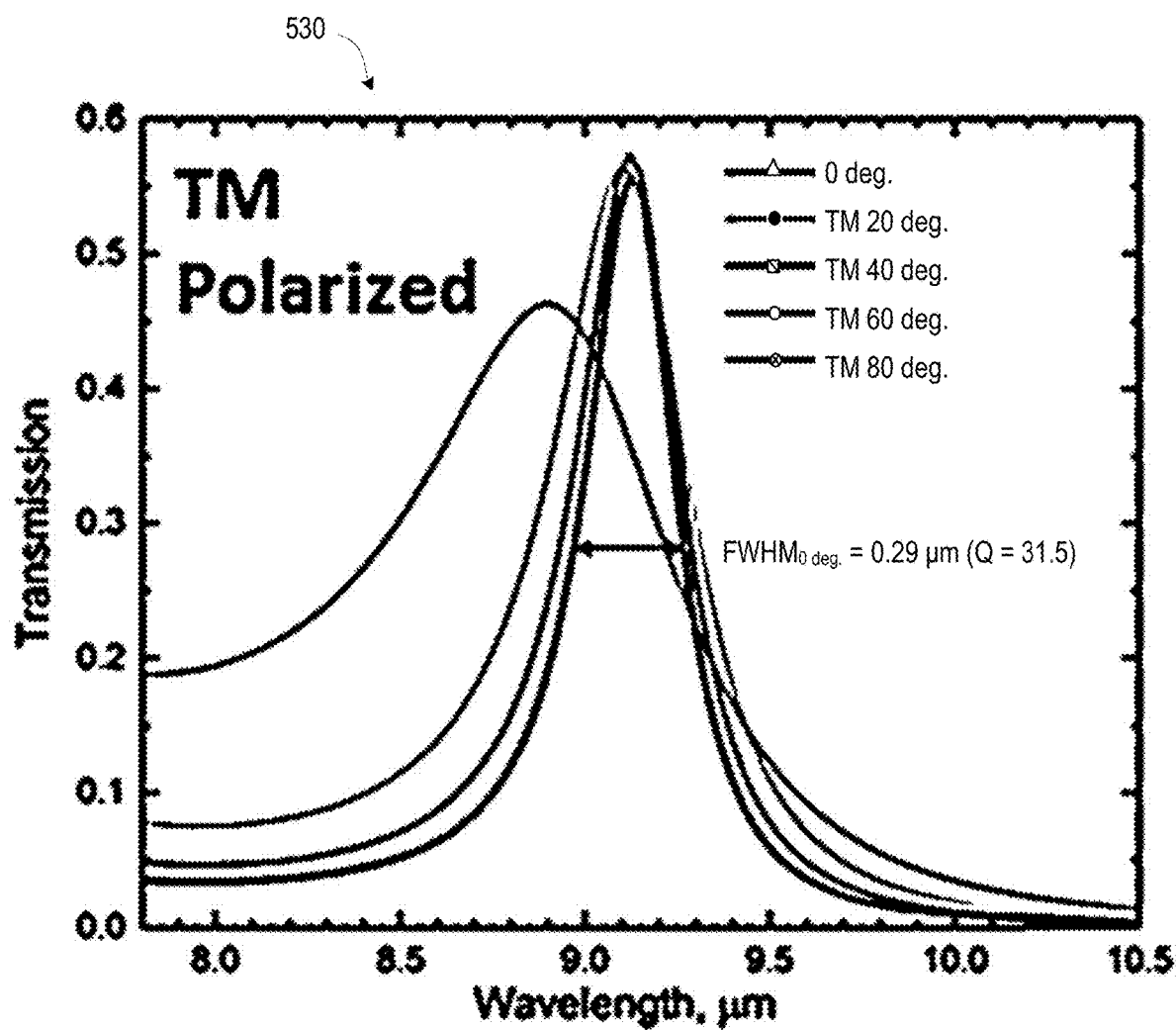
FIG. 5B, is a graphical plot of wavelength versus transmission spectra for transverse-magnetic (TM)-polarized light at different angles of incidence according to one or more embodiments.
Figure 5C:
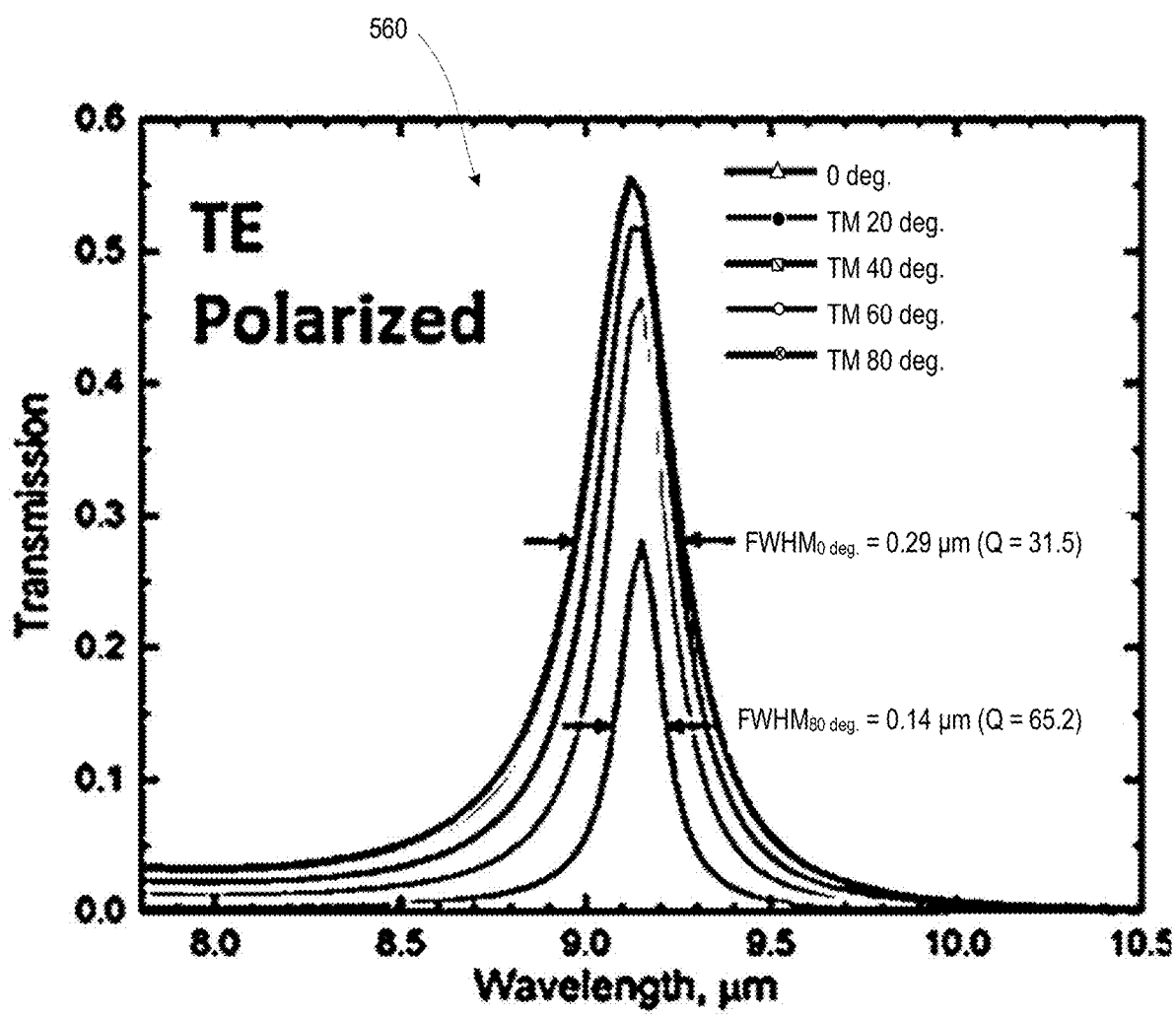
FIG. 5C is a graphical plot of wavelength versus transmission spectra for transverse-electric (TE)-polarized light at different angles of incidence, according to one or more embodiments.

FIG. 5B is a graphical plot 530 of wavelength versus transmission spectra for transverse-magnetic (TM) polarized light at different angles of incidence. FIG. 5C is a graphical plot 560 of wavelength versus transmission spectra for transverse-electric (TE) polarized light at different angles of incidence.

FIGS. 5A-5C demonstrate two dimensional array resonators and the corresponding change to polarization insensitivity. Two dimensional arrays of cylindrical resonators (one example type) are as follows using the same materials as the previous example with the same targeted wavelength range in the long-wave infrared. In this example we also used the aperture openings as shown in FIG. 1D. The cell structure is shown in FIG. 5A. The resonators are placed in square lattice with period 2 μm×2 μm. Each resonant cavity is a cylinder with diameter 1.5 μm, height 1.2 μm, filled with a high-index dielectric (Ge). From the top side the cavity is terminated by a 0.1 μm thick metal film with 1.4 μm coupling aperture filled with the same high-index dielectric. From the substrate side, there is another a 0.1 μm thick metal film with a smaller, 1.15 μm, coupling aperture. The substrate, as before, is BaF$_2$.

FIGS. 5B-5C indicate that the two dimensional array structure shows only a weak dependence of transmission spectra on the incident angle for both TM and TE polarized light. At 20° the transmission spectra are almost indistinguishable from those at normal incidence. At incident angles up to 60° some small changes occur. Reducing the diameters of coupling holes is expected to make the resonance narrower in expense of lower peak transmission.

MANNER AND PROCESS OF MAKING AND USING THE INVENTION: Devices have been fabricated using an in-house photolithography process. This process has been developed to address some of the specific challenges of the design. First, the barium fluoride substrate is fragile and sensitive to high heat, which limits processing temperatures. Second, the small feature size requires deep-UV stepper lithography, which can achieve feature sizes under 500 nm on a mass scale. Finally, a major processing goal has been to achieve conformal alternating gratings of the metal and dielectric. Towards this end, we first fabricate germanium gratings and fill in the cavities with silver.

Figure 6A:
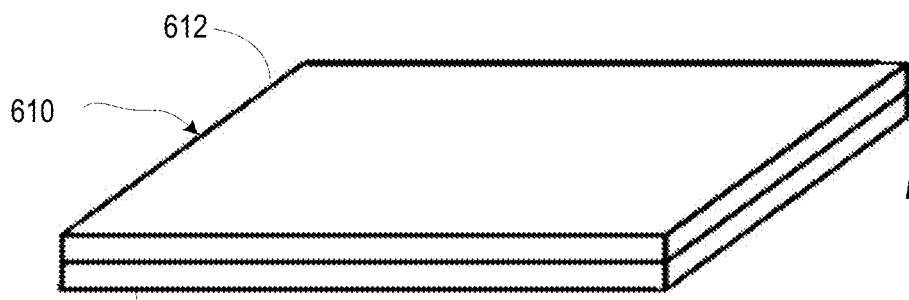
FIG. 6A is a top isometric process schematic of a sample produced with a 1.0 μm layer of germanium that is evaporated onto a barium fluoride substrate, according to one or more embodiments.
Figure 6B:
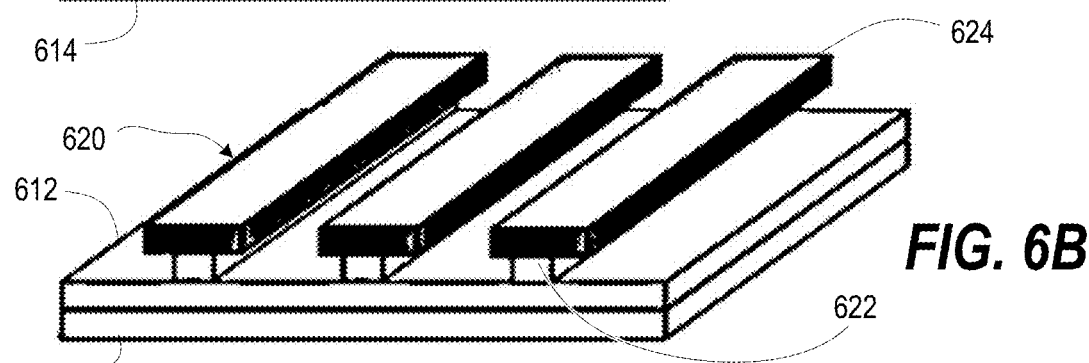
FIG. 6B is a top isometric process schematic of a patterned sample that is then patterned using a bilayer resist process, according to one or more embodiments.
Figure 6C:
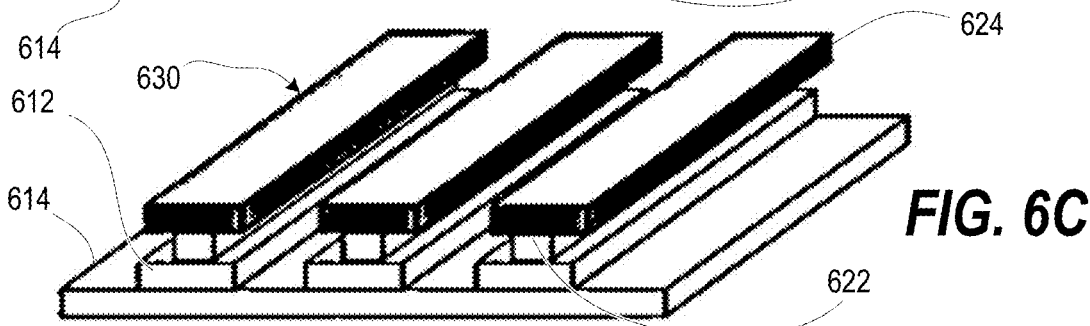
FIG. 6C is a top isometric process schematic of an etched sample produced when the patterned sample undergoes an anisotropic Reactive Ion Etch (RIE) process, according to one or more embodiments.
Figure 6D:
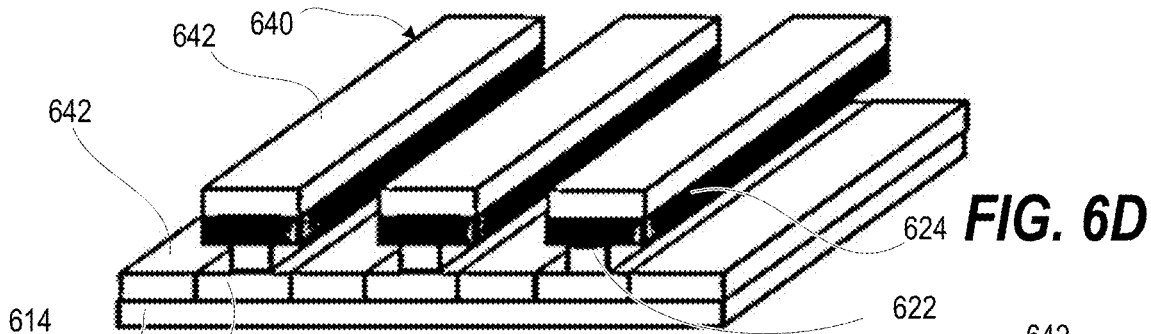
FIG. 6D is a top isometric process schematic of a completed sample wherein a silver layer is deposited on the photo resist layers, according to one or more embodiments.
Figure 6E:
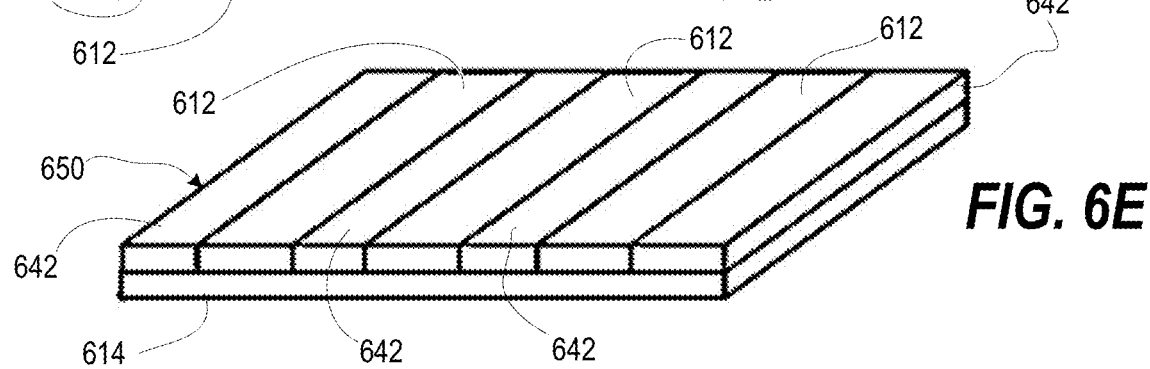
FIG. 6E is a top isometric process schematic of a completed sample having the lift off resist layers subsequently removed to reveal a planar surface of alternating germanium and silver, according to one or more embodiments.

FIGS. 6A-6E depict respective process schematics of the fabrication outline for long-wave infrared structure using the example materials discussed earlier. FIG. 6A depicts a sample 610 produced with a 1.0 µm layer 612 of germanium that is evaporated onto a barium fluoride substrate 614. FIG. 6B depicts a patterned sample 620 that is then patterned using a bilayer resist process, consisting of LOR10A and Shipley 18130. The bilayer resist process creates lift off resist layers 622 on the barium fluoride substrate 614 upon which are deposited photo resist layers 624. The LOR10A undercuts the Shipley 1813, which is necessary for a clean lift-off of the dielectric in the final step of the process. Next, FIG. 6C depicts an etched sample 630 produced when the patterned sample 620 undergoes an anisotropic Reactive Ion Etch (RIE) process that selectively etches the 1.0 µm layer 612 of germanium with straight sidewalls 632 of the remaining germanium. During this etch the top layer photo resist layers 624 is slightly etched, but the LOR10A (lift off resist layers 622), with its desired undercut, are intact. This allows for a subsequent deposition of silver without the need for re-patterning. FIG. 6D depicts a completed sample 640 wherein a silver layer 642 is deposited on the photo resist layers 624, using both normal incidence and tilted e-beam evaporation techniques. FIG. 6E depicts a completed sample 650 having the lift off resist layers 622 (FIG. 6D) subsequently removed to reveal a planar surface 652 of alternating germanium and silver. Process development and sample testing is ongoing to enhance performance of the resonant structure.

In one or more embodiments, the conducting region of the sample can be a selected structure of metals, such as silver aluminum or gold, metal silicides, metal germanides, semimetals, semiconductors, and conducting oxides. The dielectric for the cavity is not limited to germanium, but may also be silicon, silicon dioxide, silicon nitride, titanium dioxide, aluminum nitride or other relatively lossless materials. Either the conducting and/or the dielectric region may also be phase change materials such as vanadium oxide (VOx), germanium antimony tellurium (GST) or germanium antimony selenium tellurium (GSST). The cavity array, in either the one dimensional or two dimensional case, is not limited to periodic structures, but may be periodic or non-periodic. The cavity from a top-down perspective may be square, rectangular, circular, hexagonal or other shape. The cavity may include apertures or tapers at the top and bottom which may or may not be the same thickness or profile. The substrate is not required to be barium fluoride. It could be any other substrate that enables the deposition or growth structures and transmits light at the design wavelength.

According to aspects of the present innovation, a transmission filter apparatus is provided that includes: (i) a substrate to serve as a foundation for the apparatus; (ii) a layer containing resonant dielectric cavities separated by conductive regions. The dimensions and design of the dielectric cavities, thickness of the layer, and substrate, dielectric and conductive materials are chosen to achieve resonant transmission of selected wavelengths. In a particular one or more embodiments, the layer is one dimensional, i.e. you have dielectric cavities along one axis in the plane that are comparatively infinity long in the parallel plane. In a particular one or more embodiments, the layer is two dimensional, i.e. you have dielectric cavities along both axis in the plane. The dimensions in each plane may or may not be equal. In a specific one or more embodiments, the dielectric cavities are terminated on the top and/or bottom by thin metal films with small apertures or tapers.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A transmission filter apparatus comprising:
a substrate comprised of a material; and
a layer attached to the substrate and containing more than one resonant dielectric cavity that are spaced and laterally separated by conductive regions, the dielectric cavities containing a high-index dielectric material therein wherein said dielectric material has a refractive index higher than air, wherein the material comprising the substrate and the material in the dielectric cavities are different, and the dimensions and thicknesses of the substrate, layers and dielectric cavities are selected to achieve Fabry-Perot resonance transmission at selected wavelengths,
wherein each cavity is a resonator on its own and any periodicity of spacing of the cavities does not affect the resonant wavelengths.

2. The transmission filter apparatus of claim 1, wherein the more than one dielectric cavity comprise more than one slot that are linearly spaced.

3. The transmission filter apparatus of claim 2, wherein each slot of the more than one slot comprise a wider mid-portion than top and bottom portions.

4. The transmission filter apparatus of claim 3 wherein the cavities have two ends and define an aperture on one end of the cavity that interfaces with air and an aperture on the other end of the cavity that interfaces with the substrate, wherein the apertures at the interface with the substrate are smaller than the apertures that interface with air.

5. The transmission filter apparatus of claim 4 wherein the difference in the size of the apertures allows the transmission filter apparatus to achieve the same reflection coefficient at the apertures at the interface with the substrate and at the apertures that interface with air.

6. The transmission filter apparatus of claim 2 wherein the slits have a width W and the separation between the slits is equal to W.

7. The transmission filter apparatus of claim 2 wherein the slits have a width W and the separation between the slits is greater than W.

8. The transmission filter apparatus of claim 2 having a pair of opposed generally planar surfaces, wherein when the generally planar surfaces of the transmission filter apparatus are oriented horizontally and a light wave is directed into one of the generally planar surfaces of the transmission filter apparatus, the light wave propagates up and down the slits and are confined in the slits in vertical direction without plasmons or other guided waves propagating along the surface of the structure.

9. The transmission filter apparatus of claim 1, wherein each of the more than one resonant dielectric cavity comprise a vertical conduit, the more than one resonant dielectric cavity laterally spaced in a two dimension grid pattern.

10. The transmission filter apparatus of claim 9, wherein the two dimensional grid pattern comprises orthogonal spacing between adjacent resonant dielectric cavities.

11. The transmission filter apparatus of claim 9, wherein each of the more than one resonant dielectric cavity comprise a cylinder.

12. The transmission filter apparatus of claim 11, wherein each cylinder comprises a wider cylindrical mid-portion between narrower top and bottom cylindrical portions.

13. The transmission filter apparatus of claim 12 wherein the cavities have two ends and define an aperture on one end of the cavity that interfaces with air and an aperture on the other end of the cavity that interfaces with the substrate, wherein the apertures at the interface with the substrate are smaller than the apertures that interface with air.

14. The transmission filter apparatus of claim 13 wherein the difference in the size of the apertures allows the transmission filter apparatus to achieve the same reflection coefficient at the apertures at the interface with the substrate and at the apertures that interface with air.

15. The transmission filter apparatus of claim 1 wherein the substrate comprises Barium fluoride.

16. The transmission filter apparatus of claim 15 wherein the material in the dielectric cavities comprises Germanium.

17. The transmission filter apparatus of claim 1 wherein the conductive regions of the layer attached to the substrate are made of one of the following: metal silicides, metal germanides, semimetals, semiconductors, and conducting oxides.

18. The transmission filter apparatus of claim 1 wherein at least one of the conductive regions of the layer attached to the substrate and the material in the dielectric cavities comprises phase change materials.

19. The transmission filter apparatus of claim 18 wherein the phase change materials comprise one or more of vanadium oxide (VOx), germanium antimony tellurium (GST) or germanium antimony selenium tellurium (GSST).

20. The transmission filter apparatus of claim 1 wherein the selected wavelengths are between 5 $\mu$m and 14 $\mu$m.

* * * * *